(12) United States Patent  (10) Patent No.: US 8,006,477 B2
Dinu  (45) Date of Patent: Aug. 30, 2011

(54) RE-HEAT COMBUSTOR FOR A GAS TURBINE ENGINE

(75) Inventor: Constantin Dinu, Greer, SC (US)

(73) Assignee: General Electric Company, Schenectady, NY (US)

( * ) Notice: Subject to any disclaimer, the term of this patent is extended or adjusted under 35 U.S.C. 154(b) by 645 days.

(21) Appl. No.: 12/060,481

(22) Filed: Apr. 1, 2008

(65) Prior Publication Data

US 2009/0241505 A1   Oct. 1, 2009

(51) Int. Cl.
   *F02C 1/06*   (2006.01)
(52) U.S. Cl. .......................................... 60/39.17; 60/791
(58) Field of Classification Search .................. 60/39.17, 60/735, 774, 791, 39.12, 262
   See application file for complete search history.

(56) References Cited

U.S. PATENT DOCUMENTS

| 3,054,257 A | * | 9/1962 | Schelp | 60/39.17 |
| 3,315,467 A | * | 4/1967 | De Witt | 60/39.17 |
| 3,449,914 A | * | 6/1969 | Brown | 405/215 |
| 4,085,583 A | * | 4/1978 | Klees | 60/204 |
| 4,206,593 A | * | 6/1980 | Su et al. | 60/774 |
| 4,270,342 A | * | 6/1981 | Zaugg | 60/774 |
| 4,592,204 A | * | 6/1986 | Rice | 60/792 |
| 4,858,428 A | * | 8/1989 | Paul | 60/39.17 |
| 5,184,460 A | * | 2/1993 | Franciscus et al. | 60/226.1 |
| 5,557,918 A | * | 9/1996 | Chyou et al. | 60/774 |
| 6,385,959 B1 | * | 5/2002 | Montoya | 60/773 |
| 6,619,026 B2 | | 9/2003 | Carelli et al. | |
| 6,796,130 B2 | * | 9/2004 | Little et al. | 60/782 |
| 7,568,335 B2 | * | 8/2009 | Althaus | 60/39.17 |

* cited by examiner

*Primary Examiner* — Louis Casaregola
*Assistant Examiner* — Phutthiwat Wongwian
(74) *Attorney, Agent, or Firm* — Cantor Colburn LLP

(57) ABSTRACT

A turbine engine includes a turbine section having a first turbine portion and a second turbine portion arranged along a central axis. A re-heat combustor is arranged between the first and second turbine portions. The re-heat combustor includes a combustion duct having a curvilinear flow portion. The curvilinear flow portion provides an increased residence time of combustion products passing through the re-heat combustor.

13 Claims, 4 Drawing Sheets

RE-HEAT COMBUSTOR FOR A GAS TURBINE ENGINE

BACKGROUND OF THE INVENTION

The present invention relates to the art of turbomachines and, more particularly, to a re-heat combustor for a gas turbine engine.

In general, gas turbine engines combust a fuel/air mixture to release heat energy to form a high temperature gas stream. The high temperature gas stream is channeled to a turbine section via a hot gas path. More specifically, a compressor compresses incoming air to a high pressure. The high pressure air is delivered to a combustion chamber to mix with fuel and form a combustible mixture. The combustible mixture is then ignited to form a high pressure, high velocity gas stream that is delivered to a turbine section of the turbine engine. The turbine section converts thermal energy from the high temperature, high velocity gas stream to mechanical energy that rotates a turbine shaft. The turbine shaft is coupled to and drives the compressor and also other machinery such as an electrical generator.

After converting the thermal energy from the high pressure, high velocity gas stream to mechanical energy, exhaust gases are formed and vented from the turbine. The exhaust gases can either be expelled to ambient air or used in such a way so as to recuperate a portion of energy in the exhaust gases an thus increase cycle efficiency. Enhancing cycle efficiency at various operating conditions, particularly at base load, and off peak loads is always a concern. Towards that end, some turbine engines employ a reheat combustor that recycles a portion of the exhaust gases in the turbine. While adding some level of efficiency, the use of a reheat combustor, particularly between turbine sections, typically increases an axial length of the turbine engine. That is, reheat combustors require additional cooling and additional flow paths for combustion. The additional flow paths result in an overall increase in turbine shaft length. Extending the turbine shaft length creates efficiency losses and adds maintenance and reliability concerns. Reheat combustors also possess a high demand for cooling air. Typically, the cooling air is extracted from a compressor portion of the turbine engine. Unfortunately, as the high pressure cooling air is not used to produce work, extracting compressor air for cooling creates efficiency losses.

BRIEF DESCRIPTION OF THE INVENTION

A turbine engine constructed in accordance with an exemplary embodiment of the invention includes a turbine section having a first turbine portion and a second turbine portion arranged along a central axis. A re-heat combustor is arranged between the first and second turbine portions. The re-heat combustor includes a combustion duct having a curvilinear flow portion. The curvilinear flow portion provides an increased residence time of combustion products passing through the re-heat combustor.

Exemplary embodiments of the present invention also include a method of operating a turbine engine. The method includes generating an airflow in a first turbine portion of the turbine engine, and passing the airflow toward a re-heat combustor having a combustion duct. The method further includes directing the air flow through a combustion flow inlet of the combustion duct, guiding the air flow along a curvilinear flow portion of the combustion duct toward a combustion flow outlet, and passing the airflow through the combustion flow outlet into a second turbine portion of the turbine engine.

Additional features and advantages are realized through the techniques of exemplary embodiments of the present invention. Other embodiments and aspects of the invention are described in detail herein and are considered a part of the claimed invention. For a better understanding of the invention with advantages and features thereof, refer to the description and to the drawings.

DETAILED DESCRIPTION OF THE INVENTION

Figure 1:
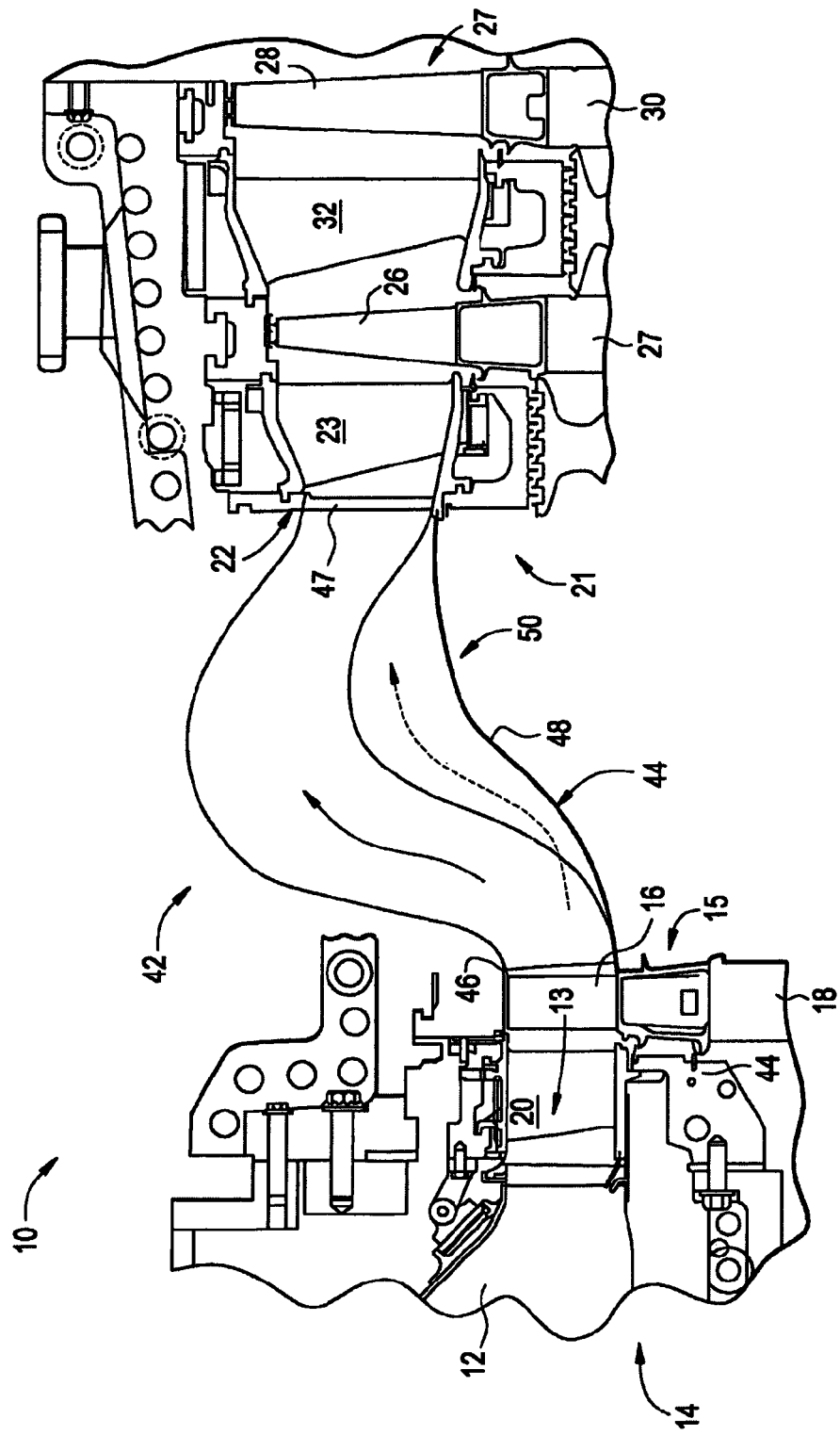
FIG. 1 is a partial, schematic representation of a turbine engine including a re-heat combustor constructed in accordance with exemplary embodiments of the present invention.

With initial reference to FIG. 1, there is illustrated a representative example of a turbine section of a gas turbine engine, generally indicated at 10. Turbine section 10 receives hot gases of combustion from an annular array of combustors (not shown), which transmit the hot gases through a transition duct or piece 12. The combustion gases pass through transition duct 12 into combustion receiving zone 13 and flow toward a first or high pressure (HP) turbine portion 14. HP turbine portion 14 includes a number of turbine stages one of which is indicated at 15. Turbine stage 15 includes a plurality of circumferentially spaced buckets, one of which is indicated at 16, mounted on, and forming part of, a turbine roller 18, and a plurality of circumferentially spaced stator vanes, one of which is indicated at 20.

Turbine section 10 also includes a second or low pressure (LP) turbine portion 21 fluidly connected to first turbine portion 14 along a central axis (not separately labeled). LP turbine section 21 includes a first LP stage 22 having a plurality of circumferentially-spaced stator vanes, one of which is indicated at 23. First LP stage 22 also includes a plurality of circumferentially-spaced buckets 26 mounted on a roller wheel 27. Also shown in FIG. 1, LP turbine portion 21 includes a second LP stage 27 having a plurality of circumferentially spaced buckets 28 mounted on a roller wheel 30, and a plurality of circumferentially spaced stator vanes 32. Of course, it will be appreciated that the number of stages present within each turbine portion 14 and 21 can vary.

In accordance with the exemplary embodiment shown. HP turbine portion 14 is joined to LP turbine portion 21 via a re-heat combustor 42. As best shown in FIGS. 2-5, re-heat combustor 42 includes a main body portion 44 having a first end section 46 that extends to a second end section 47 through an intermediate section 48 that collectively define a plurality of flow conduits, one of which is indicated at 50, arranged in an annular array about main body portion 44. As each of the plurality of flow conduits is substantially similar, a detailed description will follow with reference to flow conduit 50.

Flow conduit 50 includes a bypass duct 55 and a combustion duct 58 which, in the exemplary embodiment shown, is configured in a can-annular arrangement. Bypass duct 55 includes a first end portion 61 that extends to a second end portion 62 through an intermediate portion 63. First end portion 61 includes a bypass flow inlet 65 that is fluidly connected to HP turbine portion 14 and a bypass flow outlet 66 fluidly connected to LP turbine portion 21. As will be discussed more fully below, a first portion of a turbine air flow passes from HP turbine portion 14, into bypass flow inlet 65, through bypass duct 55 and exits into LP turbine portion 21 through bypass flow outlet 66.

Figure 2:
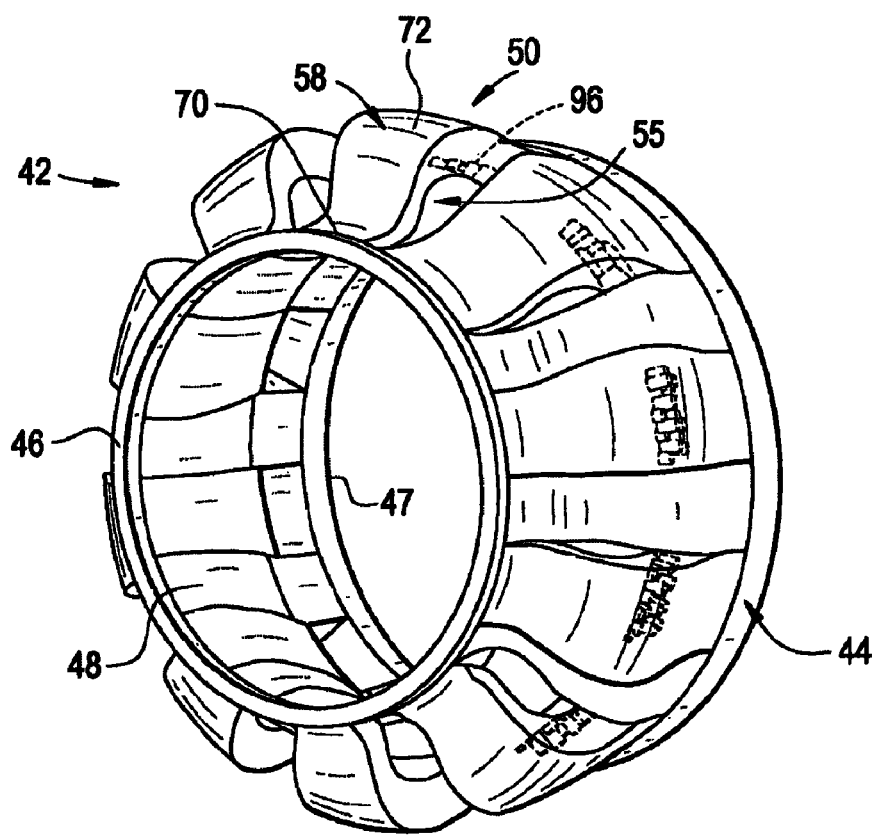
FIG. 2 is a left perspective view of the re-heat combustor of FIG. 1.
Figure 3:
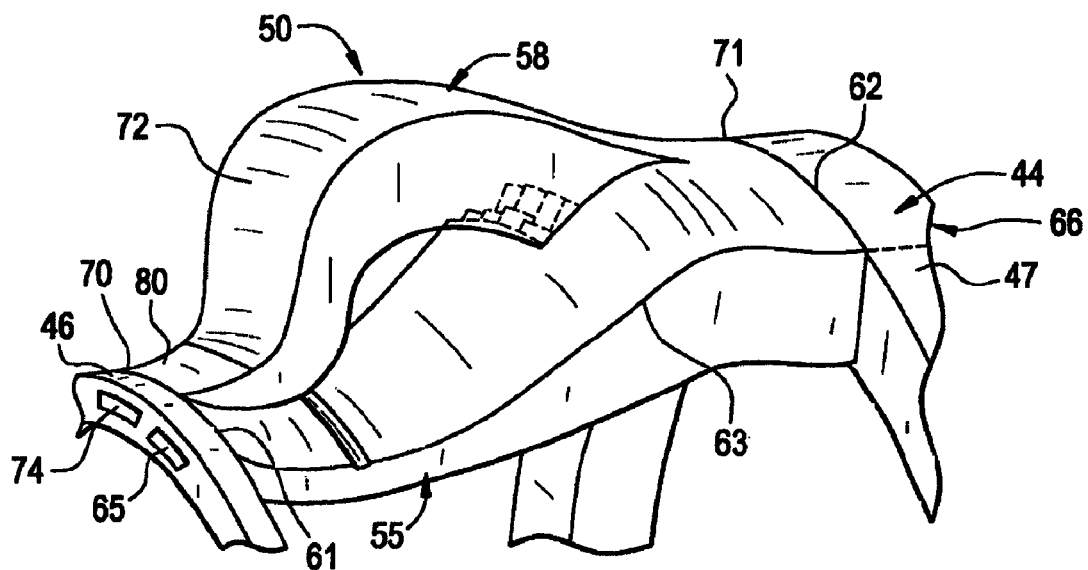
FIG. 3 is a partial perspective view of a flow conduit portion of the re-heat combustor of FIG. 2.
Figure 4:
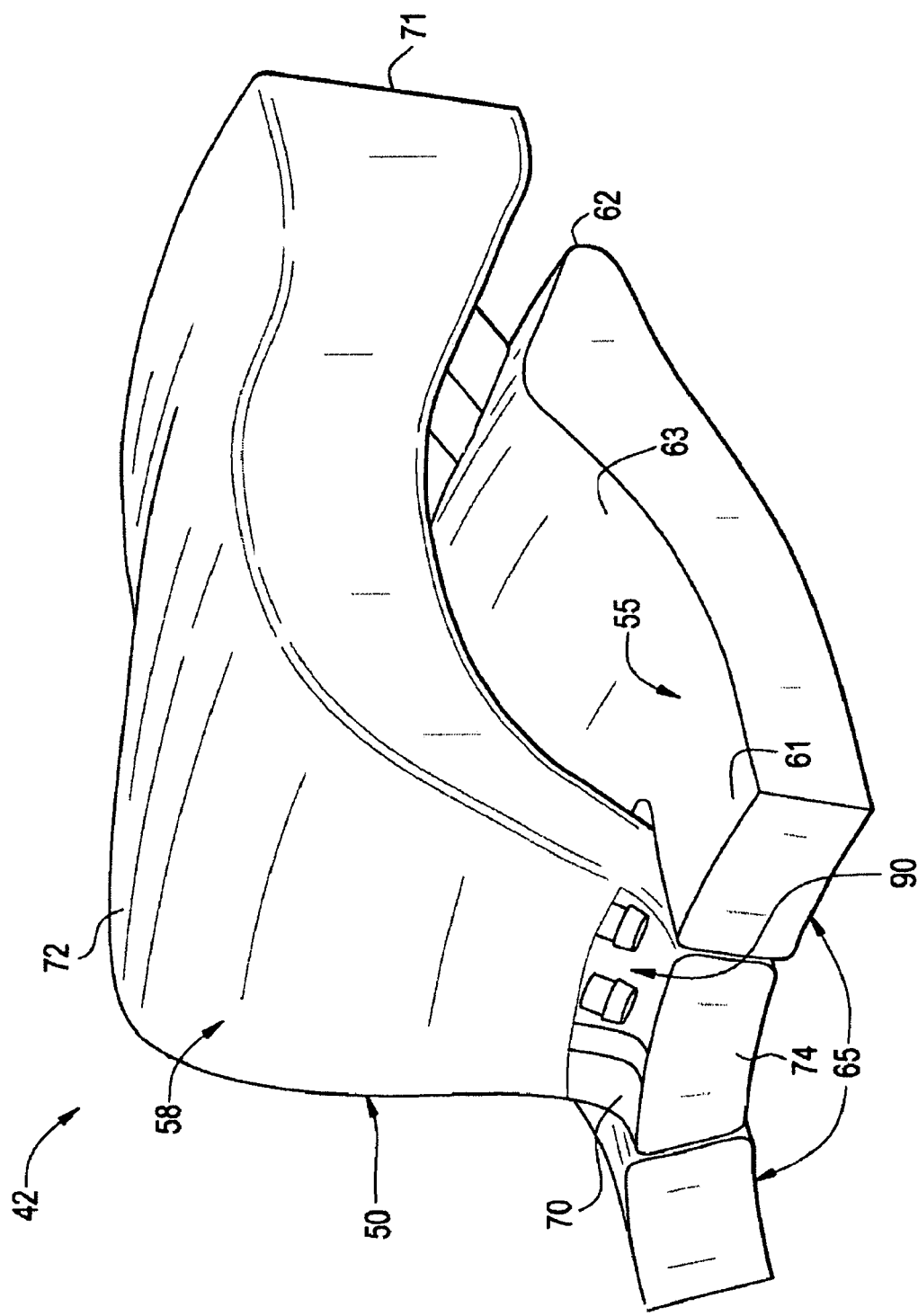
FIG. 4 is a schematic representation of a reheat combustor constructed in accordance with one exemplary embodiment of the invention.
Figure 5:
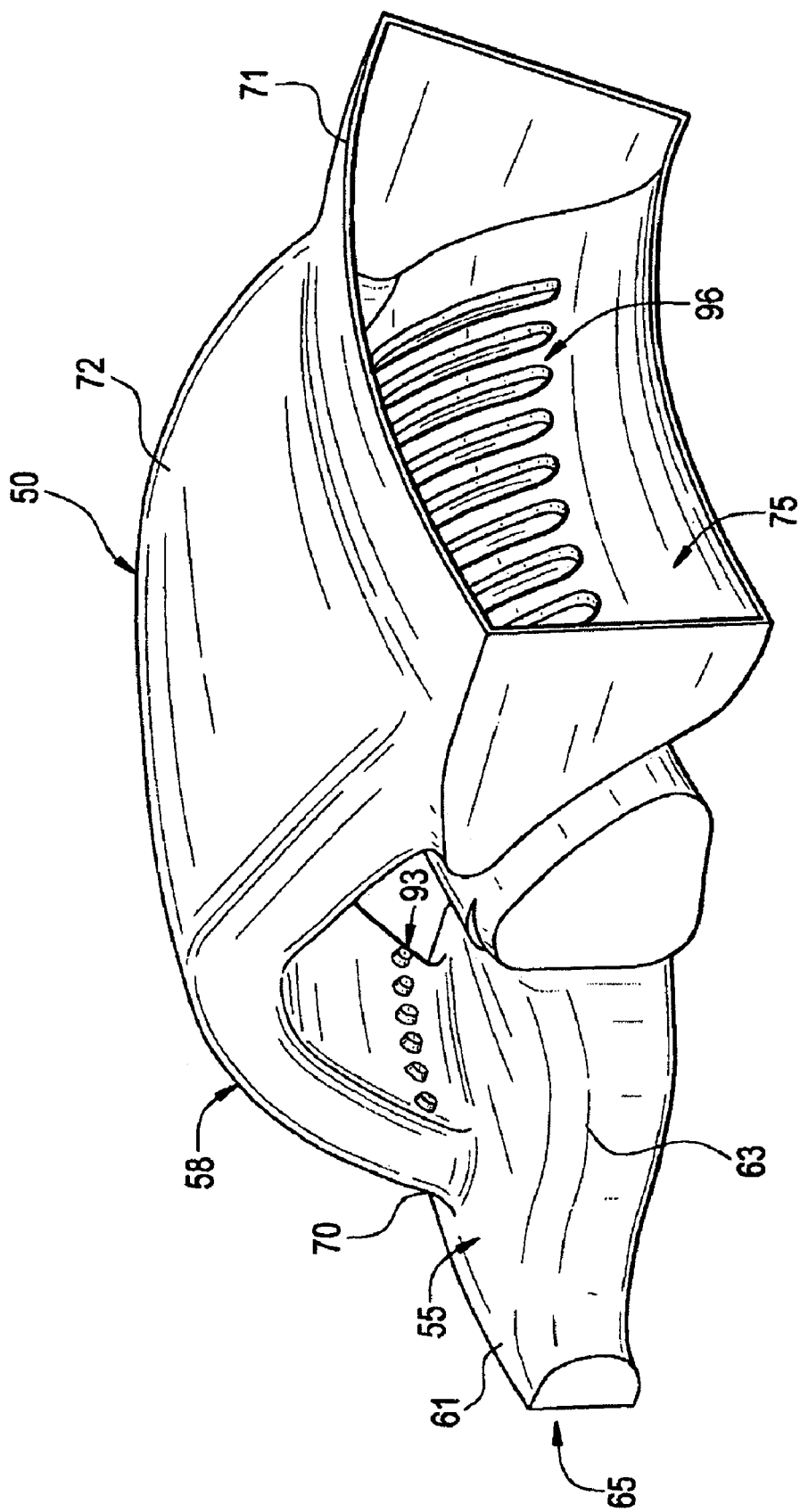
FIG. 5 is a schematic representation of a reheat combustor constructed in accordance with another exemplary embodiment of the invention.

As further shown in FIGS. 2-3 combustion duct 58 includes a first end portion 70 that extends to a second end portion 71 through an intermediate portion 72. Intermediate portion 72 is defined by an arcuate or curvilinear flow portion that extends outward and is spaced from bypass duct 55. Combustion duct 58 further includes a combustion flow inlet 74 arranged at first end portion 70 and a combustion air outlet 75 arranged at second end portion 71. In addition, combustion duct 58 is provided with a variable position flow diverter 80 arranged at combustion flow inlet 74. Flow diverter 80 is pivotally mounted at first end portion 70 and selectively shifted to alter an inlet geometry of combustion flow inlet 74 in order to enhance combustion efficiency, particularly at lower turbine speeds. It should be appreciated that flow diverter 80 could direct all airflow through the bypass duct 55 at certain load conditions, e.g., when enthalpy addition in re-heat combustor 42 is not needed thereby reducing a pressure drop at re-heat combustor 42 and increasing gas turbine efficiency.

In accordance with the exemplary embodiment shown, combustion duct 58 is provided with a plurality of fuel injectors indicated generally at 90 that are fluidly connected to a plurality of fuel ports indicated generally at 93 (See FIG. 5) and at least one fuel manifold (not shown). Fuel injectors 90 are arranged proximate to first end portion 70 and are configured to introduce fuel into an air flow passing through combustion duct 58. Combustion duct 58 is also provided with a plurality of dilution jets 96 arranged proximate to second end portion 71. Dilution jets 96 fluidly connect bypass duct 55 with combustion duct 58. Dilution jets 96 allow a portion of the air flow passing through bypass duct 55 to enter into combustion duct 58 to dilute the products of combustion before passing though combustion duct outlet 75 and into LP turbine portion 21.

At this point it should be appreciated that the curvilinear flow portion of the combustion duct enhances combustion control efficiency. That is, combustion products passing though combustion duct 58 are provided with an increased residence time without expanding an axial length of re-heat combustor 42 and, by extension, minimizing an axial length of turbine portion 10. By increasing residence time of the combustion products, re-heat combustor enhances combustion efficiency while, at the same time, maintaining emissions within compliance levels. Also, it should be recognized that the overall shape/geometry of the curvilinear flow portion can be adjusted/altered/tailored to establish a residence time for specific turbines without increasing turbine length. In addition, by spacing the combustion duct outward from main body portion of the re-heat combustor, cooling requirements are split between the combustion duct and the bypass duct thereby allowing for increased flexibility of hot component cooling. Finally, when cooling is required, a steam jacket can be mounted about the combustion ducts to provide additional cooling and further enhance gas turbine performance (emissions, output and efficiency) as less air is utilized for cooling.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the exemplary embodiments of the present invention if they have structural elements that do not differ from the literal language of the claims, or if they include equivalent structural elements with insubstantial differences from the literal language of the claims.

The invention claimed is:

1. A turbine engine comprising:
a turbine section including a first turbine portion and a second turbine portion arranged along a central axis; and
a re-heat combustor arranged between the first and second turbine portions, the re-heat combustor including a combustion duct having a combustion flow inlet and a bypass flow inlet adjacent to the combustion flow inlet, the combustion flow inlet extends to a combustion flow outlet through a curvilinear flow portion having a vertex, the curvilinear flow portion extending from the combustion flow inlet to the vertex radially outwardly from the central axis, the curvilinear flow portion providing increased residence time of combustion products passing through the re-heat combustor.

2. The turbine engine according to claim 1, wherein the curvilinear flow portion is spaced from the re-heat combustor.

3. The turbine engine according to claim 1, wherein the combustion duct includes a combustion flow inlet is fluidly connected to the first turbine portion and the combustion flow outlet is fluidly connected to the second turbine portion.

4. The turbine engine according to claim 3, wherein the combustion duct includes a flow diverter arranged at the combustion flow inlet.

5. The turbine engine according to claim 4, wherein the flow diverter is pivotally mounted to the re-heat combustor, the flow diverter being selectively positioned to vary a geometry of the combustion flow inlet.

6. The turbine engine according to claim 3, wherein the re-heat combustor includes at least one fuel injector mounted in the combustion duct.

7. The turbine engine according to claim 6, wherein the at least one fuel injector is mounted at the combustion flow inlet.

8. The turbine engine according to claim 3, wherein the re-heat combustor includes a bypass duct positioned adjacent the combustion duct.

9. The turbine engine according to claim 8, wherein the re-heat combustor includes at least one dilution jet fluidly connecting the bypass duct and the combustion duct.

10. The turbine engine according to claim 9, wherein the at least one dilution jet is mounted adjacent the combustion flow outlet.

11. The turbine engine according to claim 8, wherein the bypass duct includes a bypass flow inlet and a bypass flow outlet, the bypass flow inlet being arranged adjacent the combustion flow inlet and the bypass flow outlet being arranged adjacent the combustion flow outlet.

12. The turbine engine according to claim 1, wherein the re-heat combustor has one of a can-annular array and an annular geometry.

13. The turbine engine according to claim 1, wherein the first turbine portion is a high pressure turbine portion and the second turbine portion is a low pressure turbine portion.

\* \* \* \* \*